US008903309B2

(12) United States Patent
Wells

(10) Patent No.: US 8,903,309 B2
(45) Date of Patent: Dec. 2, 2014

(54) TRUE STEREO WIRELESS HEADSET AND METHOD

(75) Inventor: John Andrew Wells, Paradise Valley, AZ (US)

(73) Assignee: J.A. Wells and Associates, L.L.C., Paradise Valley, AZ (US)

( * ) Notice: Subject to any disclaimer, the term of this patent is extended or adjusted under 35 U.S.C. 154(b) by 305 days.

(21) Appl. No.: 13/507,104

(22) Filed: Jun. 5, 2012

(65) Prior Publication Data

US 2013/0324047 A1 Dec. 5, 2013

(51) Int. Cl.
*H04B 7/00* (2006.01)

(52) U.S. Cl.
USPC ........ 455/41.1; 455/41.2; 455/41.3; 455/563; 455/569.1

(58) Field of Classification Search
USPC .......... 455/41.3, 563, 569.1, 570, 223, 550.1; 381/326, 151, 375, 122, 92, 93, 380, 381/370, 72
See application file for complete search history.

(56) References Cited

U.S. PATENT DOCUMENTS 5,323,468 A 6/1994 Bottesch
6,952,483 B2 10/2005 Boesen et al.
7,076,077 B2 7/2006 Atsumi et al.
7,185,734 B2 * 3/2007 Widmer et al. ............... 181/135
7,283,850 B2 * 10/2007 Granovetter et al. ......... 455/570
7,502,484 B2 3/2009 Ngia et al.
7,627,289 B2 12/2009 Huddart
2002/0057810 A1 5/2002 Boesen
2002/0118852 A1 8/2002 Boesen
2007/0012507 A1 * 1/2007 Lyon ............................ 181/126
2008/0175399 A1 7/2008 Kim et al.
2009/0047905 A1 2/2009 Yang
2009/0060231 A1 3/2009 Buroojy
2009/0298420 A1 12/2009 Haartsen et al.
2010/0098270 A1 * 4/2010 Abolfathi et al. ............. 381/151
2010/0172519 A1 7/2010 Kimura
2010/0246860 A1 9/2010 Rye et al.
2011/0170723 A1 7/2011 Ryann
2011/0243356 A1 * 10/2011 Koike et al. ................... 381/326
2012/0245406 A1 * 9/2012 Aghamohammadi .......... 600/25

* cited by examiner

*Primary Examiner* — Ganiyu A Hanidu
(74) *Attorney, Agent, or Firm* — Eugene H. Eickholt

(57) ABSTRACT

A headset is disclosed having a transmitting unit for each ear. Each unit (2) mounts a first bone vibration sensor (3) in the external auditory canal and a second bone vibration sensor (7) next to the jawbone/skull. Controls on a housing module (4) activate either sensor. The first sensor is moveable outside the auditory canal by a flexible support attached to the module. A digital speech processor shared by both sensors is mounted within the module. Two-way communication is maintained between the user and an external source (40), such as a cellular telephone which has a multi-task processor with memory and applications stored therein for receiving and transmitting user voice commands and text messages. A recently developed Bluetooth® protocol transmitter (50) and antenna used with the external source permits digital wireless simultaneous synchronization signals to be sent to both units for true stereo sound.

19 Claims, 5 Drawing Sheets

TRUE STEREO WIRELESS HEADSET AND METHOD

BACKGROUND

The present invention relates to the field of communication devices and, more particularly, to an improved bone conduction assembly for communication headsets using wireless signals.

One known type of bone conduction assembly has a microphone sensor placed in the exterior auditory canal of the ear to translate sound wave vibrations (e.g., speech) from the mouth to the ear canal into electrical signals for wireless transmission to an external source (e.g., a cellular telephone).

To fit the sensor in the auditory canal places constraints on the shape and size of the sensor. Maximum speech detection is enhanced by using a deformable type seal or cushion adjacent the sensor to block extraneous external sound waves. Swimmers, for example, favor a water tight seal. While this is useful in some environments it is detrimental to safety in other situations where an unblocked ear canal is preferred to receive ambient sounds.

Also, this type relies on a tightly fitting seal and proper location placement to hold the sensor in place. Often, various factors such as fit quality and movement caused by the user seeking a comfort adjustment cause an ear sensor to move and lose proper contact with the wall of the auditory canal or to even fall out.

Another known type of bone conduction assembly has a microphone sensor placed in contact with skin covering the jawbone/skull of the user. This type picks up vibrations caused by speaking. While this type does not block the auditory canal it is prone to extraneous external sound waves found in a noisy environment. This type is often hung over each ear or attached to an over-the-head holding band. This type may also be used by swimmers Both types often claim to be suitable for wireless stereo signal reception. However, past Bluetooth® protocol wireless headsets have had to contend with the limitation of an older Bluetooth® protocol signal being a one to one wireless pairing. Near "true" stereo is achieved by a wire connection passing over the head of the user to electrically connect the two ear pieces of the headsets with one earpiece receiving the signal ahead of the second. A slight, but detectable to the user, delay is introduced as the Bluetooth® signal is not simultaneous and synchronized. An improved "true stereo" Bluetooth® wireless signal uses a new Bluetooth® protocol enabled transmitter and associated circuitry connected to a sound source, such as an iPhone®, iPod®, iPad®, iTouch®, computer, mp3 player, gaming device or television to transmit a synchronized and simultaneous sound signal to free standing speakers.

SUMMARY

One aspect of the present invention provides for each ear to receive a voice transmitting unit with each unit mounting a first bone sound vibration sensor located in the auditory canal of the user and a second bone sound vibration sensor mounted adjacent the jawbone/skull. Both sensors are mounted to a common housing module and are alternatively enabled depending on the user's preference. Such arrangement allows for the advantageous use of the same electronic components mounted in the housing module for each type bone sensor. Each sensor may use a known acoustic-to-electric transducer.

If one type bone sensor is working poorly or not working, the other sensor type mounted with the same voice transmitting unit may serve as a backup.

Another aspect of the present invention includes a flexible support mechanism which is attached at one end to the auditory canal sensor and at the other end to the common housing module. Such an arrangement permits the sensor to be removed from the canal so as not to block the exterior of the canal allowing ambient noise signals access to the ear. Removal may be for reasons of safety and/or comfort.

Another aspect of the present invention provides for a tapered accordion type flexible sound seal adjacent the auditory canal sensor which seal is of annular form and slips over the tip of an extension mounting the sensor.

Another aspect of the present invention provides for an extension (which may or may not be flexible) mounted at one end the auditory canal sensor and having the other end capable of being quickly disconnected from the housing module. This allows for changing different size sensors or extensions for use by different people. This facilitates resale value of the headset as well as maintenance/repair of the auditory canal sensor.

Yet another aspect of the present invention provides for a hands free operation of an external sound source, such as a cellular telephone, preferably a smartphone, by using transmit/receive electrical components mounted in the housing module of the bone conduction sensors in conjunction with applications loaded into a memory component of the smartphone. Apple Corporation's Siri® application is an example of voice commands used to operate a nearby smartphone to provide texting as well as voice response capability. The external sound source may also be a computer in wireless communication with the bone conduction assembly.

Yet another aspect of the present invention is the use of the bone conduction sensor assembly described above as part of a "true" stereo system by sending Bluetooth® protocol signals from one external source having a Bluetooth® enabled transmitter wirelessly to a speaker in each bone conduction sensor assembly in a simultaneous and synchronous manner. As an example, such a transmitter and circuitry when installed in a Bluetooth® enabled smartphone is used in the present invention to ensure "true" stereo reception in each voice unit.

It should be understood that the present invention has wide-ranging applications, not specifically limited to the examples disclosed in this specification. By way of example only, the present invention may be used in a HOMELAND SECURITY situation by emergency responders such as firefighters, police and the military. Other examples are the use of the present invention in live music applications and Facebook® applications.

DETAILED DESCRIPTION

Figure 1:
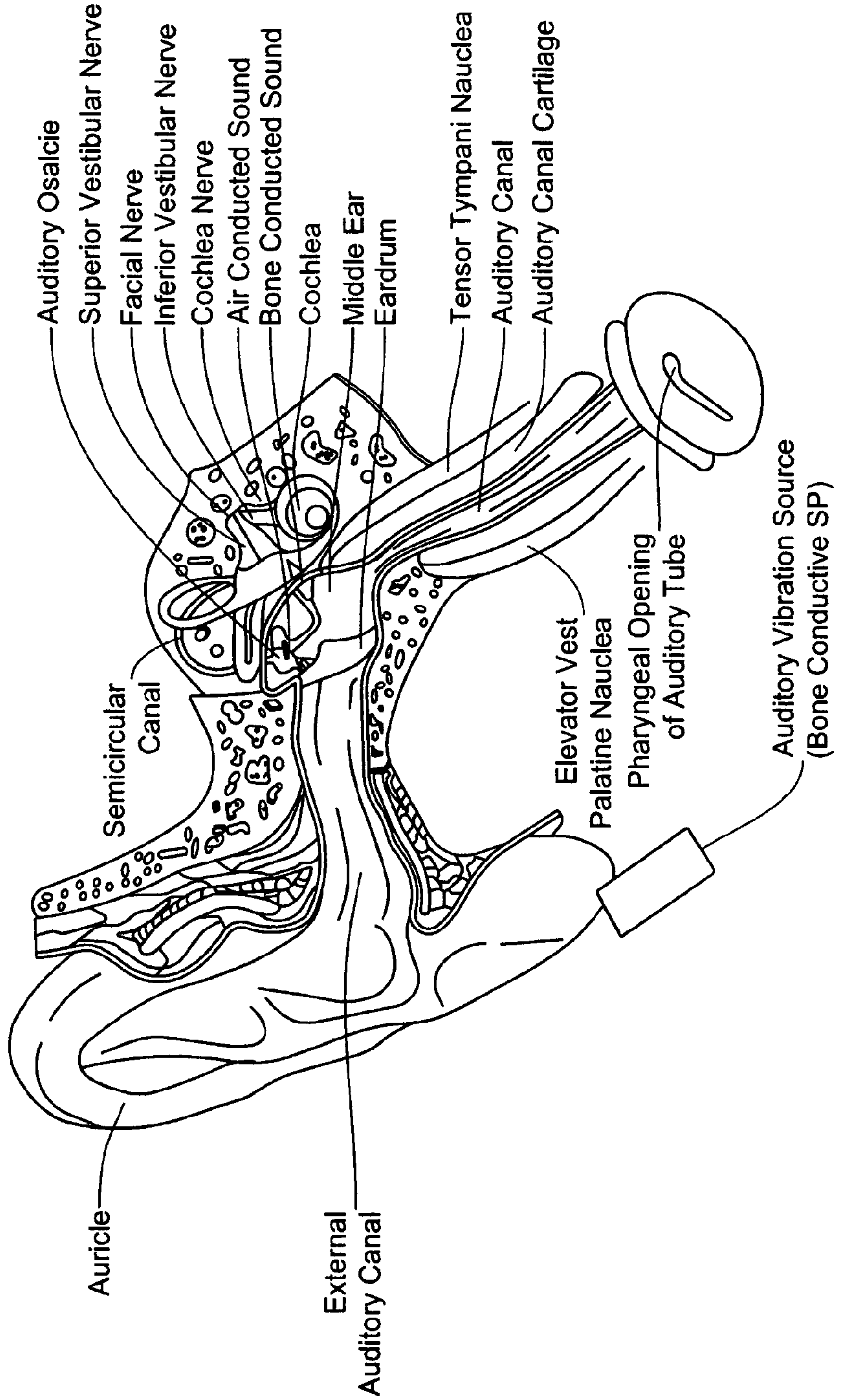
FIG. 1 (PRIOR ART)
FIG. 1 is an illustration of an ear using a prior art bone/skull auditory sound sensor.

As shown in FIG. 1, sound waves enter through the ear and strike the ear drum. The ear drum converts the sound wave into a physical vibration of the ear drum and transmits that physical vibration to the cochlea bone and auditory system. The cochlea converts the physical vibrations into signals carried by nerve cells to the brain. Bone conduction relies on passing sound through bones to the auditory system. In FIG. 1 the bones of the head such as jawbone/skull bones carry the sound vibrations bypassing the ear canal and ear drum. A prior art device 1 such as a piezoelectric transducer speaker receives wireless sound signals from an audio device and converts them to vibrations which are transmitted through the skin and jaw/skull bones to the inner ear of the user.

Figure 2:
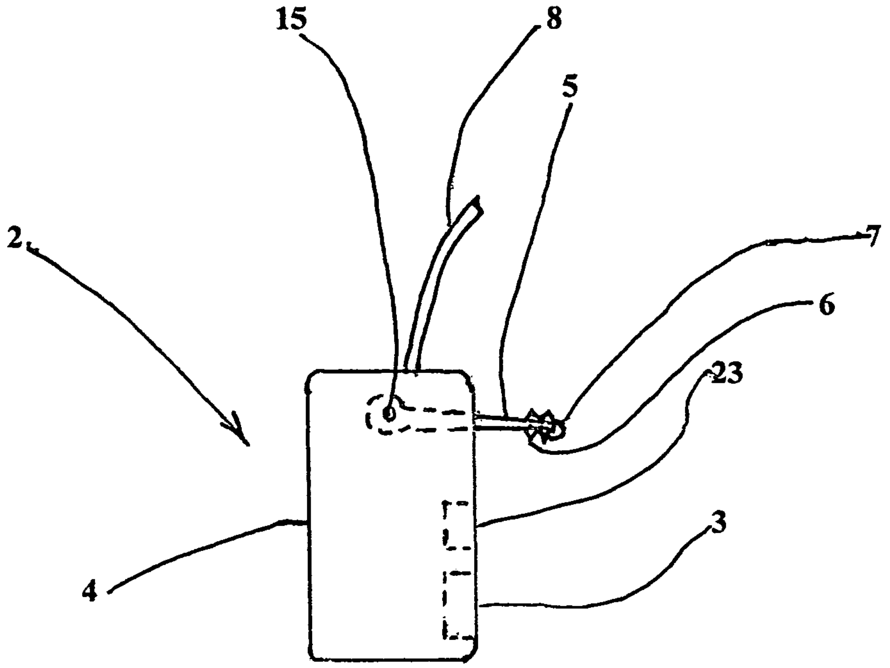
FIG. 2 is an example of a bone conduction assembly of the present invention.

An example of the bone conduction assembly 2 of the present invention is depicted in FIG. 2 which shows a frontal view. A jawbone/skull bones sensor 3 for contact with the cheek of a user is mounted along the lower portion of a housing module 4. Also mounted on the same side as the bone sensor is a speaker or speaker unit 23 which is in contact with the jawbone/skull of the user. Within the housing module 4 all the circuitry, electronic components, battery power and transmitter/receiver antennas are contained. In one embodiment lever extension 5 is mounted to the housing module 4 by a pivot connection 15 functioning as a hinge. FIG. 2 shows the lever extension position for entry of the lever extension 5 into the external auditory canal of one ear of the user. A soft sound seal 6 in the form of a compressible accordion is mounted near the end of the lever extension. An external auditory canal sensor 7 is mounted at the tip of the lever extension 5. An ear hanger hook 8 extends from the top of the housing module. In place of the lever extension 5 a twistable wire connection know for use with hearing aids may also be used. To achieve stereo sound reception a mirror image second bone conduction assembly (not shown) is used with the other ear of the user.

Figure 3:
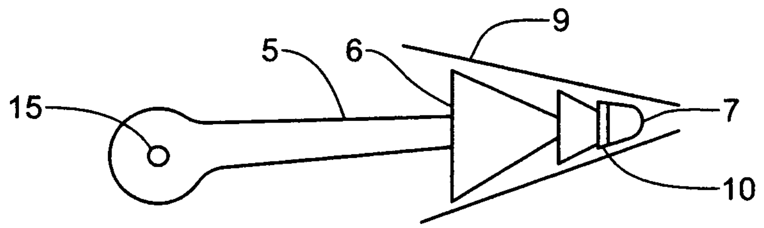
FIG. 3 is an enlarged view of an extension mounted external auditory canal sensor with adjacent sound seal shown detached from its common housing module.

The lever extension 5, seal 6 and sensor 7 are depicted removed from connection with the housing module in an enlarged FIG. 3 which shows more detail. In FIG. 3, the lever extension 5 tapers to accommodate the taper of the narrowing external auditory canal 9. Adjacent the end portion of the taper of the lever extension 5 external auditory canal sensor 7 is attached. This attachment may be by means (not shown) such as to permit ease of removal of the sensor 7 for purposes of maintenance or replacement. This feature allows custom fitting of different sizes of sensor 7 adding to the resale value of the bone conduction assembly 2. Detent 10 in the form of an annular rib is immediately behind the sensor 7 to act as a stop for the soft sound seal 6 shown in the preferred form of a tapering accordion seal. Detent 10 is removable to permit the seal 6 to be pressed over the tapering surface of the lever extension 5 during assembly. The widening taper of the lever extension 5 acts to prevent movement of the seal 6 in an axial direction along the extension 5 which may be in rod form at its narrowest portion. Appropriate wiring circuitry is encased inside the lever extension 5 to permit communication with the controlling electronics enclosed in housing module 4. The removable feature of detent 10 also permits a custom fitting of different sized seals which also contributes to the resale value of assembly 2. A suitable compressible polymer material may be selected for the seal 6 to ensure ambient sound is blocked out when placed in the ear canal while providing a comfortable fit.

Figure 4:
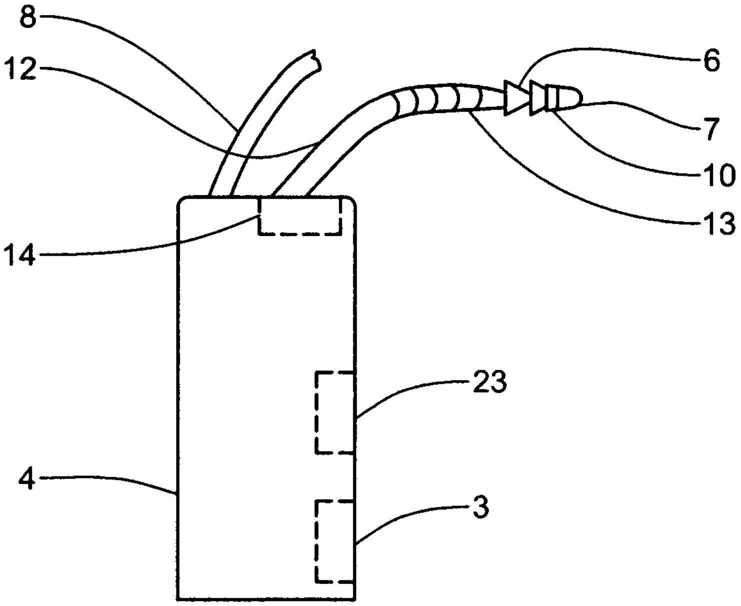
FIG. 4 is an example of a flexible bendable linkage connecting the external auditory canal sensor with its common housing module.
Figure 5:
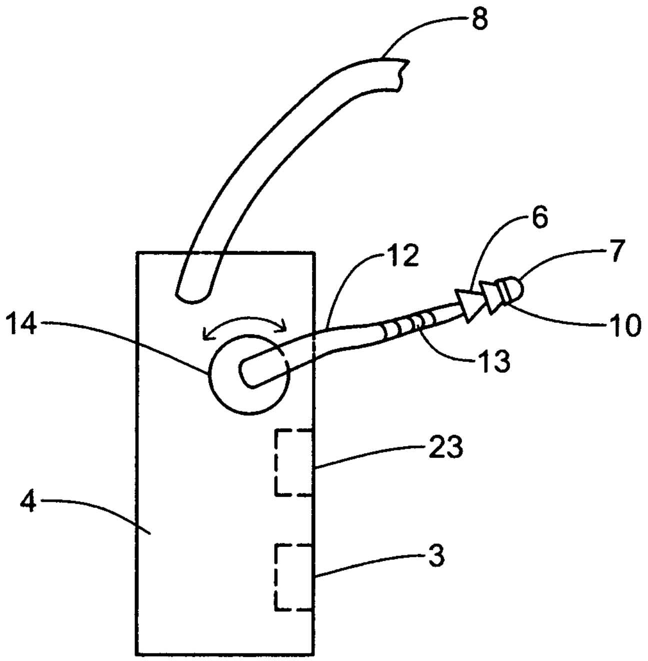
FIG. 5 is a top view of FIG. 4 showing rotating disc connection 14.

A different embodiment than the hinged embodiment described above is illustrated in FIG. 4 and in FIG. 5. A hollow thin flexible tapering tube arm 12 having an easily bendable portion 13 is used to attach the sensor 7, detent 10 and seal 6 to the housing module 4. In a preferred form the sensor 7, detent 10 and seal 6 are made easily removable as above described with reference to FIG. 3. A rotating disc 14 mounted on top of the housing module 4 forms the connection of the tube arm 12 to the top of the housing module 4 to allow positioning of the arm 12 away from the ear. As before mentioned, a mirror image second bone conduction assembly (not shown) is used with the other ear of the user to receive wireless "true" stereo sound signals.

It is also possible to place the in ear bone sensor 7 outside the seal 6 in contact with both the external auditory canal and the seal to sense voice vibrations.

Figure 6:
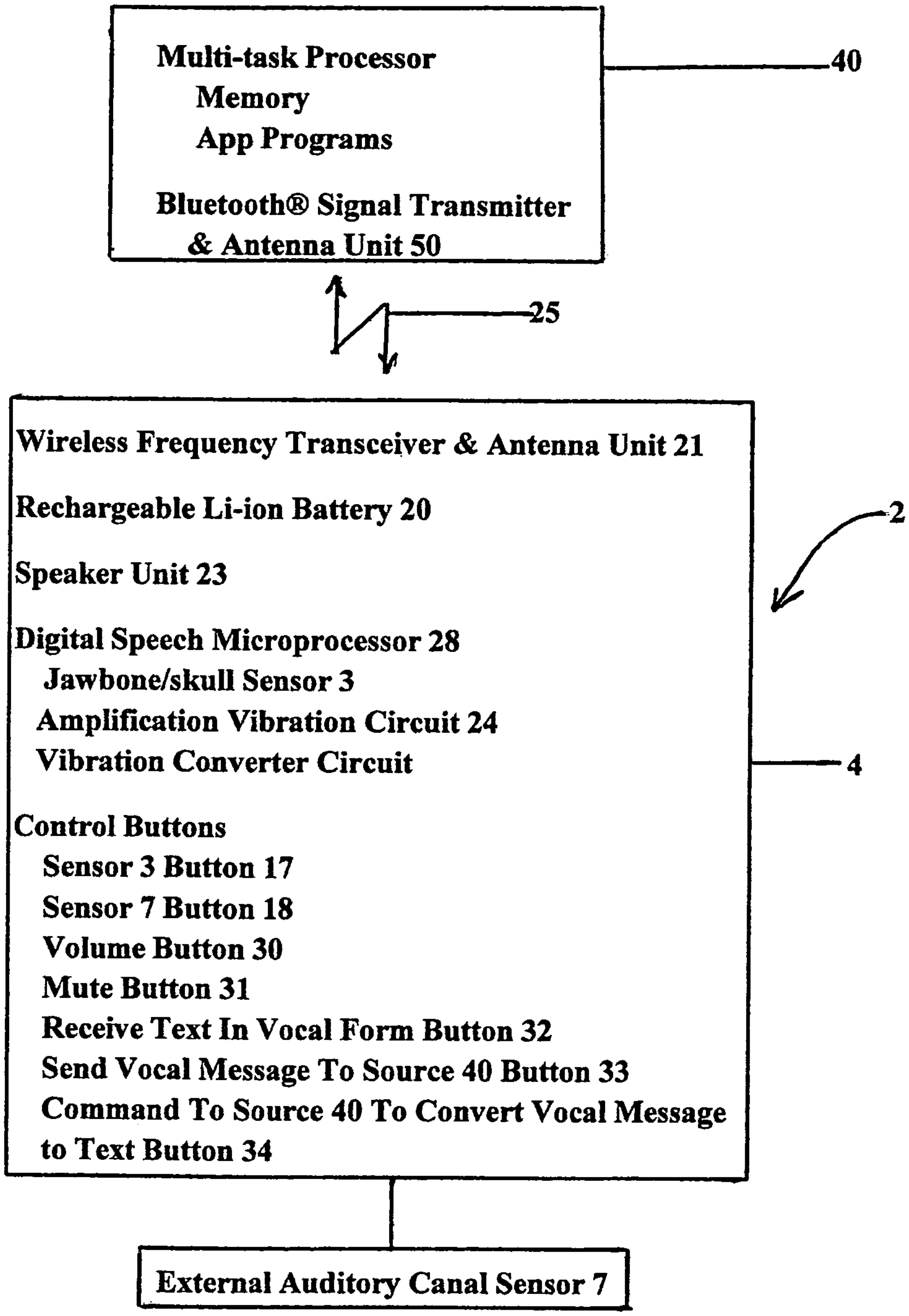
FIG. 6 is an example of a way to send and receive wireless communication between an external sound source, such as a smartphone, and each ear's bone conduction assembly.

A block diagram of the electronic components used to enable a method of two-way wireless communication is illustrated in FIG. 6. Housed in each housing module 4 is a battery 20 supplying power to the electronics of each bone conduction assembly 2. The battery 20 may be of the well known rechargeable type, such as a lithium-ion battery. Buttons 17 and 18 permit the user to select which bone conduction sensor 3 or 7 to activate. Other buttons 30 and 31 and dedicated circuitry may be employed for volume or mute control. Button 32 may be used to control dedicated circuits for receiving from a smartphone a "text" message in vocal form. Button 33 is used to send a vocal message to the source 40. A further button 34 with dedicated circuit may also be provided to output a wireless message to be received in text form by the smartphone. A microprocessor 28 is used to control the functionality of all circuitry and electronic components. Processor 28 functions as a speech processor having circuitry for converting sound vibration signals to electric wireless signals. The exact location of the above referenced control buttons on the housing modules are not critical to the present invention. Additional components in the housing modules 4 may include a conventional transceiver and antenna assembly 21. This assembly may include separate and discrete receiver, transmitter and antenna components or such components may be made integral with one another as a conventional transceiver 30. A conventional speaker or speaker unit 23 with amplifiable voice receiver 24 unit may be located within the housing modules 4 for enabling wireless two-way voice communication with the external sound source 40. This speaker unit 23 is maintained in a power reception mode regardless of which of the bone conductor sensors 3 or 7 is in active mode. An amplifier circuit (not shown) may also be used in conjunction with the receiver unit 24 as part of the speech processor 28. Both bone conduction sensors 3 and 7 are enclosed in waterproof material as are the housing modules.

FIG. 6 also depicts the wireless Bluetooth® protocol two-way linkage signal 25 between a remote sound source 40, such as a smartphone having the "true" stereo transmitter 50 and associated circuitry build in or added to handle an upgraded state of the art Bluetooth® signal platform to send simultaneous and synchronized digital sound signals to two separate and independent headphone or ear bud speakers.

The sound source 40 may have a built-in multi-task processor with applications loaded into a memory of the multi-task processor. Conversion either way of text to speech or speech to text is an example of a desirable program app.

As set forth above, it will be apparent to those skilled in the communications art that a user of the disclosed system has the capability to have true "stereo" music wirelessly sent from virtually any digital music playing source within 100 feet to head bone vibration speakers.

Also apparent is the ability of a headset user to communicate (receive and respond) to two-way voice or text communication. For example, this ability allows safe hands-free use of popular cellular smartphones or mobile vehicle communication devices.

The disclosed system has potential applications for HOMELAND SECURITY emergency response providers and the military because of the built-in redundancy of two different bone conduction sensors and the inherent situational advantages due to locations thereof. Depending on the situation, the optional use of just one bone conduction assembly 2 would provide a mono sound communication capability in one ear while freeing the other ear to hear ambient sounds.

Although exemplary embodiments describe particular earpiece headset assemblies for pairing to certain types of mobile devices such as cellular phones or smartphones, additional embodiments are possible. For example but not limited thereto, the assemblies 2 may be configured for wirelessly coupling or pairing to a host of other portable digital audio devices, such as radio, television, iTouch®, iPod®, MP3 player or computer devices. The portable audio devices may include gaming devices such as the Sony Playstation® Portable game device or book tablet devices such as the Hewlett-Packard Envy 14 Spectre Ultrabook™ which features a built-in Beats Audio™.

The exemplary embodiments of the present invention described and illustrated herein are merely illustrative. It should be understood that modifications may be made to these embodiments without departing from the spirit and scope of the present invention. Thus, the scope of the invention is intended to be defined only in terms of the following claims, as may be amended, with each claim being expressly incorporated into this disclosure as an embodiment of the invention.

What is claimed is:

1. Voice transmitting units configured to provide two-way voice communication between a user and an external sound or text source comprising:

one voice transmitting unit for each ear of the user;

each voice transmitting unit having a first bone sound vibration sensor sized to fit in and be easily removable from an auditory canal of the user in a noninvasive manner;

each voice transmitting unit further comprising a second bone sound vibration sensor having an external noninvasive sensor surface for placement next to the skin of the jawbone/skull of the user;

each first bone sound vibration sensor having first digitalized circuitry configured to convert sound vibrations of the mastoid bones of the user to electrical signals;

each second bone sound vibration sensor having second digitalized circuitry configured to convert sound vibrations of either the jawbone/skull of the user to electrical signals;

each voice transmitting unit further comprising a housing module mounting a digital speech processor in communication with either the first or second bone sound vibration sensor;

each housing module further containing a button controlled circuitry configured for selecting one of the first or second bone sound vibration sensors to be in operative mode by the user;

the digital speech processor further including a receiver, a speaker, a digital signal transceiver antenna and a wireless radio frequency transmitter to provide the voice transmitting units with the two-way voice communication between the user and an external sound or text source; and wherein for each voice transmitting unit the first bone sound vibration sensor is attached by a flexible mechanism to the housing module to permit the user to move each first bone sound vibration sensor to a storage position just outside the auditory canal of the user.

2. The voice transmitting units of claim 1 wherein the flexible mechanism of each voice transmitting unit includes a hinge.

3. The voice transmitting units of claim 1 wherein the first bone sound vibration sensor is readily detachable from the housing module for replacement with different sized bone sound vibrations sensors to accommodate different sized auditory canals of different users.

4. The voice transmitting units of claim 1 wherein each voice transmitting unit is waterproof.

5. The voice transmitting units of claim 1 wherein the voice transmitting units function together as a Bluetooth "true" stereo headset;

and the digital speech processor includes a built-in application that allows the user through voice command to receive and send text messages to the external sound or text source;

and wherein the housing module has a text button to open a text message from an external text message source read by a voice and a respond button to send or verbally command send of a text message response to the external text message source using the digital speech processor.

6. Voice transmitting units configured to provide two-way voice communication between a user and an external sound or text source comprising:

one voice transmitting unit for each ear of the user;

each voice transmitting unit having a first bone sound vibration sensor sized to fit in and be easily removable from an auditory canal of the user in a noninvasive manner;

each voice transmitting unit further comprising a second bone sound vibration sensor having an external noninvasive sensor surface for placement next to the skin of the jawbone/skull of the user;

each first bone sound vibration sensor having first digitalized circuitry configured to convert sound vibrations of the mastoid bones of the user to electrical signals;

each second bone sound vibration sensor having second digitalized circuitry configured to convert sound vibrations of either the jawbone/skull of the user to electrical signals;

each voice transmitting unit further comprising a housing module mounting a digital speech processor in communication with either the first or second bone sound vibration sensor;

each housing module further containing a button controlled circuitry configured for selecting one of the first or second bone sound vibration sensors to be in operative mode by the user;

the digital speech processor further including a receiver, a speaker, a digital signal transceiver antenna and a wireless radio frequency transmitter to provide the voice transmitting units with the two-way voice communication between the user and an external sound or text source;

and wherein the first bone sound vibration sensor is readily detachable from the housing module for replacement with different sized bone sound vibration sensors to accommodate different sized auditory canals of different users.

7. The voice transmitting units of claim 6 wherein for each voice transmitting unit the speaker has a volume control mounted on the housing module to modulate the strength of the sound being received from the external sound or text source to the individual comfort of the user.

8. Voice transmitting units configured to provide two-way voice communication between a user and an external sound or text source comprising:

one voice transmitting unit for each ear of the user;

each voice transmitting unit having a first bone sound vibration sensor sized to fit in and be easily removable from an auditory canal of the user in a noninvasive manner;

each voice transmitting unit further comprising a second bone sound vibration sensor having an external noninvasive sensor surface for placement next to the skin of the jawbone/skull of the user;

each first bone sound vibration sensor having first digitalized circuitry configured to convert sound vibrations of the mastoid bones of the user to electrical signals, each second bone sound vibration sensor having second digitalized circuitry configured to convert sound vibrations of either the jawbone/skull of the user to electrical signals;

each voice transmitting unit further comprising a housing module mounting a digital speech processor in communication with either the first or second bone sound vibration sensor;

each housing module further containing a button controlled circuitry configured for selecting one of the first or second bone sound vibration sensors to be in operative mode by the user;

the digital speech processor further including a receiver, a speaker, a digital signal transceiver antenna and a wireless radio frequency transmitter to provide the voice transmitting units with the two-way voice communication between the user and an external sound or text source; and wherein each voice transmitting unit is waterproof.

9. The voice transmitting units of claim 8 wherein for each voice transmitting unit the receiver digitally receives a simultaneous and synchronous wireless sound signal to achieve "true" stereo sound reception from the external sound or text source.

10. The voice transmitting units of claim 9 wherein for each voice transmitting unit the digital signal transceiver antenna receives the simultaneous and synchronous wireless sound signal in the form of a Bluetooth® protocol "true" stereo wireless signal.

11. The voice transmitting units of claim 8 wherein for each voice transmitting unit the first bone sound vibration sensor is readily detachable from the housing module for replacement with different sized bone sound vibrations sensors to accommodate different sized auditory canals of different users.

12. A method for using a two-way wireless voice communication system having ear mountable voice transmitting units, one voice transmitting unit for each ear, in combination with an external wireless sound signal or text source comprising:

the step of mounting the voice transmitting units on the ears of the user in an easily removable manner;

the further step of generating a "true" stereo audio signal by using a Bluetooth protocol enabled transmitter to send in a simultaneous and synchronous manner the "true" stereo audio signal from the external wireless sound signal or text source to the voice transmitting units;

the further step of providing the external wireless sound signal or text source with a multi-task processor;

the further step of providing the multi-task processor with a memory;

the further step of loading the memory with a multitude of application programs including voice signal applications;

the further step of providing each ear mountable voice transmitting unit with at least one bone sound vibration sensor;

the further step of selectively converting sound vibrations sensed by the at least one bone sound vibration sensor which sound vibrations emanate from either the mastoid bones of the user or the jaw/bone skull of the user to electrical signals;

the further step of wirelessly transmitting the electrical signals to the multi-task processor to selectively activate the voice signal applications;

the further step of providing each voice transmitting unit with a housing module mounting a digital speech processor in communication with the at least one bone sound vibration sensor;

the further step of providing two-way voice communication between the user and the external wireless sound signal or text source;

the further step of using as the external sound bone vibration sensor a text enabled cellular telephone; and the further step of providing in each ear mountable voice transmitting unit a built-in application in the digital speech processor that allows the user through voice commands to send and receive text messages hands free of the cellular telephone.

13. The method of claim 12 further comprising the step of mounting in a noninvasive manner the at least one bone sound vibration sensor in the external auditory canal of the user.

14. The method of claim 12 further comprising the step of positioning a vibration sensing surface of the at least one bone sound vibration sensor in noninvasive contact with the skin over the jawbone/skull of the user.

15. The method of claim 14 further comprising the step of selecting for activation either a bone sound vibration sensor mounted in the external auditory canal of the user or the bone sound vibration sensor positioned in noninvasive contact with the skin over the jawbone/skull of the user.

16. A method of using a two-way voice communication system having ear mountable voice transmitting units, one voice transmitting unit for each ear, in combination with an external wireless sound signal or text source comprising:

the step of mounting the voice transmitting units on the ears of the user in an easily removable manner;

the further step of generating a "true" stereo audio signal by using a Bluetooth protocol enabled transmitter to send in a simultaneous and synchronous manner the "true" stereo audio signal from the external wireless sound signal or text source to the voice transmitting units;

the further step of providing the external wireless sound signal or text source with a multi-task processor;

the further step of providing the multi-task processor with a memory;

the further step of loading the memory with a multitude of application programs including:

voice signal applications;

the further step of providing each ear mountable voice transmitting unit with at least one bone sound vibration sensor;

the further step of selectively converting sound vibrations sensed by the at least one bone sound vibration sensor which sound vibrations emanate from either the mastoid bones of the user or the jaw/bone skull of the user to electrical signals;

the further step of wirelessly transmitting the electrical signals to the multi-task processor to selectively activate the voice signal applications;

the further step of providing each voice transmitting unit with a housing module mounting a digital speech processor in communication with the at least one bone sound vibration sensor;

the further step of providing two-way voice communication between the user and the external wireless sound signal or text source;

the further step of using control commands operable by the user on the housing module to initiate either an outgoing verbal or text message or respond to an incoming cellular telephone text message sent by the external wireless sound signal or text source using one of a verbal command or a text button open or send command by using the digital speech processor to thereby have the option of receiving or sending a wireless message to the external wireless sound signal or text source in either voice or text format.

17. The method of claim 16 further comprising the step of positioning a vibration sensing surface of the at least one bone sound vibration sensor in noninvasive contact with the skin over the jawbone/skull of the user.

18. Voice transmitting units configured to provide two-way voice communication between a user and an external sound or text source comprising:

one voice transmitting unit for each ear of the user;

each voice transmitting unit having a first bone sound vibration sensor sized to fit in and be easily removable from an auditory canal of the user in a noninvasive manner;

each voice transmitting unit further comprising a second bone sound vibration sensor having an external noninvasive sensor surface for placement next to the skin of the jawbone/skull of the user;

each first bone sound vibration sensor having first digitalized circuitry configured to convert sound vibrations of the mastoid bones of the user to electrical signals;

each second bone sound vibration sensor having second digitalized circuitry configured to convert sound vibrations of either the jawbone/skull of the user to electrical signals;

each voice transmitting unit further comprising a housing module mounting a digital speech processor in communication with either the first or second bone sound vibration sensor;

the digital speech processor further including a receiver, a speaker, a digital signal transceiver antenna and a wireless radio frequency transmitter to provide the voice transmitting units with the two-way voice communication between the user and an external sound or text source;

and wherein for each voice transmitting unit the housing module contains a button controlled circuitry configured for selecting one of the first or second bone sound vibration sensors to being operative mode by the user.

19. The voice transmitting units of claim 18 wherein the housing module for each ear of the user has control buttons thereon permitting independent actuation providing a mono-sound backup redundancy to allow wireless sound communication in one ear and ambient sound hearing in the other ear.

* * * * *